FIG. 1

Patented Oct. 6, 1953

2,654,883

UNITED STATES PATENT OFFICE 2,654,883

RADIO OBJECT LOCATING SYSTEM

Donald F. McAvoy, Belmar, N. J.

Application April 20, 1943, Serial No. 483,711

5 Claims. (Cl. 343—7.3)

(Granted under Title 35, U. S. Code (1952), sec. 266)

The invention described herein may be manufactured and used by or for the Government for governmental purposes, without the payment to me of any royalty thereon.

This invention relates to a radio pulse-echo object locating system, and more particularly to a system for automatic ranging of a single echo-producing object.

In the systems of this type, a pulse of ultra-high frequency energy is radiated by a highly directional antenna. If the transmitted pulse strikes an object capable of re-radiating the radio frequency waves, it will be reflected, in part, back to its source by this object. This echo pulse, on its return to its source, has sufficient energy to produce an observable effect in a suitable receiver located in the vicinity of the original source of pulses. Generally the effect consists of visual indications on a cathode-ray oscilloscope in a form of vertical peaks projecting upward from a horizontal baseline. These visual indications, together with the angular position of the antenna, are utilized for determining the location of the object.

Under certain conditions, a complete reliance on the data obtained by manual adjustment of controls unjustifiably limits the possibilities of the system by lowering its accuracy. The vertical peaks, produced by the echoes, may vary in amplitude because of fluctuations in the intensities of the echoes, interference signals, which may add or subtract from the echoes, because of variations in the transmission medium, variations in the intensity of the echo when the object producing the echo changes its angular position and its distance with respect to the object-locating system, and because of other causes which need not be discussed here. Moreover, the signal pattern, as it actually appears on the oscilloscope screen, generally includes a large number of echoes proper as well as a multitude of pulsating signals, commonly called "noise." Also illumination, generally found on the oscilloscope screen, as compared with daylight, is low; thus, when the equipment is used in daylight, there is a very marked contrast in light intensities found on the oscilloscope screen and bright surroundings. This contrast sometimes produces temporary blindness among operators due to characteristic changes from light to dark and vice versa.

All these effects tend to tire the operators, strain their eyes and make them non-responsive to small changes in the amplitude and position of echoes on the oscilloscope screen. This, added to the normal human error which increases very rapidly under combat conditions, causes the operators to make relatively large errors in range and azimuth determinations. Since these errors, which are attributable solely to the manual operation of the system remain fixed, no advantage is obtained by increasing the accuracy of radio locators, thus causing the high precision of the locators to be completely submerged in comparatively large errors committed by the operators during manual operation of controls. Therefore, if higher precision of radio locators is to be reflected in the final data, the errors produced by the operators must be eliminated. The most direct method of accomplishing this result is by eliminating this source of errors altogether. This may be done by transferring some of the duties of the operators at a predetermined stage of normal operating cycle of the radio locator to an automatic equipment, the performance of which would excel manual operation of controls, and would thus enable one to attain that limit of accuracy which is imposed only by the system itself.

The disclosed system also includes an indicating instrument of a zero-center scale type which provides an indication of the amount and direction of deviation from on target position.

It is, therefore, an object of this invention to provide a motor driven equipment for automatic ranging of an echo selected by range operator.

Another object of this invention is to provide a range meter for indicating the relative position of the selected echo-producing object with respect to the locator.

The novel features which I believe to be characteristic of my invention are set forth with particularity in the appended claims; my invention itself, however, both as to its organization and method of operation, together with further objects and advantages thereof, may best be understood by reference to the following description taken in connection with the accompanying drawings in which—

*General description of the automatic ranger and radio locator*

Before proceeding with the description of the automatic ranger, a description of the radio object-locating system to which it is connected will be given first. It is that class of radio object-locating system which uses a common synchronizing oscillator for controlling the operation of the transmitting and receiving channels, this oscillator keeping the two channels constantly in the strictest synchronism. A single antenna array is used for transmitting and receiving the signals. This antenna is arranged for horizontal polarization of the signals. The antenna beam is shifted in a horizontal plane from one position to the other by means of a lobe switcher, and a plurality of signals is transmitted and received first over one lobe, and then over the other. If the antenna points directly at any given object in a horizontal plane, the intensity of the echo signals produced by this object over the two antenna beams will be equal. This equality in the beam components of the echo signal is used for determining the azimuth of the echo producing object.

In order to determine the range of the echo producing object, a distance between the transmitted pulse and the selected echo pulse is measured on the screen of the range oscilloscope by operating a phase shifter connected between a synchronizing oscillator and the range oscilloscope. This positions the selected echo signal on the screen of the range oscilloscope so that it appears in the center of a small rectangular notch 700, Fig. 7, which bisects the sweep line of the range oscilloscope screen. The shift in phase of the sinusoidal wave generated by the synchronizing oscillator is used as a means for measuring time consumed for the transmitted pulse to reach the object and for the echo signal to return to the antenna array.

The automatic ranger provides an apparatus which automatically keeps the selected echo properly centered on the screen of the range oscilloscope after the operator transfers control of the system over to the automatic ranger. The automatic ranger comprises two parallel channels connected to the receiver and to a time discriminating network. Each channel receives a time discriminating pulse in synchronism with the selected echo signal, one pulse leading the selected echo signal in one channel, and the other pulse lagging the echo signal in the other channel. When the selected echo signal has a proper phase relationship with respect to the time-discriminating pulses, the two channels are normally non-conductive except for a peak portion of the selected echo. However, when the echo changes its phase relationship with respect to the time-discriminating pulses, which happens when the echo producing object either approaches or recedes from the antenna array, then the conductivity of one channel is increased, and the conductivity of the other channel is decreased, depending upon the direction of shift of the echo. The resultant predominating current is amplified and impressed on a torque amplifier, which is mechanically coupled through a direct current motor to that phase shifter which is used for keeping the selected echo signal centrally located on the screen of the range oscilloscope. Since the range is determined by changing the setting of the phase shifter, it follows that the above mentioned operation will automatically keep the phase shifter adjusted in step with any change in range of the moving object.

*Description of the radio object-locating system*

Figure 1:
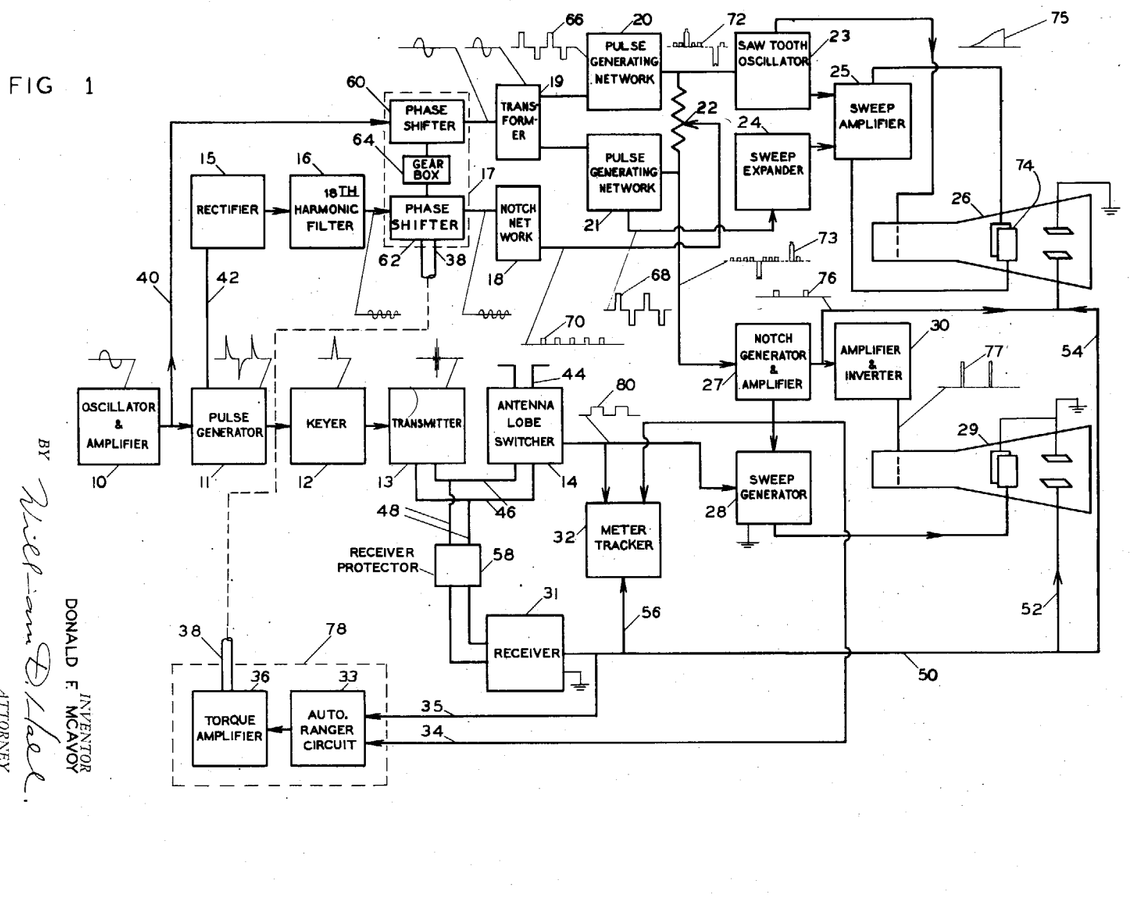
Figure 1 is a block diagram of a radio object locating system to which my invention relates, and connections between said system and the automatic ranger.

Referring now more in particular to Fig. 1, it illustrates block diagrams of the radio object-locating system, and of the automatic ranger connected to several components of the system. A synchronizing oscillator 10 is connected to a transmitter 13 thru a pulse generator 11 and a keyer 12. Oscillator 10 is also connected to the components of a receiver over conductors 40 and 42. Transmitter 13 as well as a receiver 31, the latter being shown in the lower central portion of the diagram, are both connected to the same antenna array 44 over transmission lines 46 and 48, and an antenna lobe switcher 14. A receiver protector 58 is interposed across transmission line 48 to protect the receiver during transmitting periods from the powerful transmitted signals. The output of the receiver is connected over conductors 50 and 52 to the vertical deflection plates of an azimuth oscilloscope 29, and over conductors 50 and 54 to the vertical deflection plates of a range oscilloscope 26. The receiver's output is also connected to a meter tracker 32 over a conductor 56. The meter tracker has a zero-center scale meter which indicates at any given time the direction of the antenna array 44 from its on-object position with respect to the object producing the selected echo signal.

The automatic ranger 78 is illustrated in the lower left corner of the block diagram. It comprises an automatic ranger circuit 33, and a torque amplifier 36 with its shaft 38 connected to a phase shifter 17 illustrated in the upper central portion of the diagram. Automatic ranger circuit 33 is connected to the output of receiver 31 over conductor 35, and to a notch generator and amplifier 27 over conductor 34.

The upper part of the block diagram, beginning with a rectifier 15 and a phase shifter 60, consists of a plurality of circuits which are used for generating sweeps and oscilloscope grid blocking potentials for the range and azimuth oscilloscopes in synchronism with the transmitted signal in such a manner, that all the reflected echoes within the range of the system appear on the range oscilloscope, while only the selected echo appears on the screen of the azimuth oscilloscope.

Referring now to a more detailed description of Fig. 1, a sinusoidal wave generated by oscillator 10 is impressed on a pulse generator 11 where it is transformed into a series of positive and negative pulses of short duration. These pulses are impressed on keyer 12 which transforms them into a series of positive pulses of only a few microseconds duration. These are used for keying transmitter 13 which sends into transmission line 46, antenna lobe switcher 14 and the highly directional antenna array 44 a high frequency pulse used for exploring the area which is under the influence of the antenna field. The antenna lobe switcher 14 comprises a condenser type rotating switch which is capable of shifting the angle formed by the antenna beam in a horizontal plane over a small angle, so that the transmitted electromagnetic energy forms first one directive beam, and then the other directive beam, the two beams being displaced with respect to each other in a horizontal plane by an angle which is in the order of a few degrees. The above antenna lobe switching in a horizontal plane provides a double-tracking exploratory field in azimuth, and it is this double-tracking principle that enables one to produce two laterally displaced echo components on the screen of the azimuth oscilloscope; the TR amplitudes are equal when antenna 44 points directly at the echo producing object.

The transmitted electromagnetic energy is reflected back by any object capable of reflecting electromagnetic energy, and a small portion of it reaches antenna 44 where it induces a voltage which is impressed on receiver 31 through antenna lobe switcher 14, transmission line 46, transmission line 49, and receiver protector 58. The output of the receiver is impressed on the vertical plates of the azimuth oscilloscope 29 over conductors 50 and 52 in such a manner that only the echo signal selected by the range operator, with its lobe components laterally displaced, appears on the screen of the azimuth oscilloscope. The visual indications produced on the screen of the range oscilloscope, which is connected to receiver 31 over conductors 50 and 54, differ from those produced on the screen of the azimuth oscilloscope in that the lobe components of the echo do not have any lateral displacement, and, therefore, they produce only a single retraced image of the echo. Moreover, all echoes reaching antenna array 44 are reproduced on the screen of the range oscilloscope.

In order to accomplish this result, the sweep voltage generators connected to the horizontal plates of the azimuth and range oscilloscopes are made to operate synchronously with the transmission of the exploring signals. The generation of the sweep voltages is as follows: The output of oscillator 10 is impressed on range unit 17, which comprises a phase shifter 60, a second phase shifter 62, and a gear box 64 mechanically interconnecting phase shifter 60 with phase shifter 62. Phase shifter 62 is also connected to synchronizing oscillator 10 through pulse generator 11, a rectifier 15, and a filter 16, which are used for generating an even harmonic of the frequency generated by synchronizing oscillator 10. In the system under consideration, this harmonic represents the 18th harmonic. The reason for using a harmonic and two phase shifters is briefly as follows: Since the accuracy of any phase shifter is in the order of plus or minus 1.5 degrees, or a total of 3 degrees, the phase shifter may introduce a considerable error in the range determination when it is used in connection with a long range radio object-locating system. In order to obtain a greater range accuracy, the radio object locating system outlined in this specification employs two phase shifting networks with the phase shifter employed for shifting the phase of the harmonic controlling the firing of the sweep circuit of the oscilloscopes, and, as a consequence, controlling the accuracy in the range determinations. Increased accuracy in range determination may be obtained by employment of an even higher harmonic than the 18th. Sufficient accuracy, however, is obtainable with the system under consideration with the 18th harmonic. The harmonic must be an even harmonic so that the pulse, which is 180 degrees out of phase with the sweep control pulse, may be selected to control the center notch produced on the screen of the range oscilloscope, as it will be described more in detail later. In this way the center notch is always in the center of the sweep line on the range oscilloscope.

From the connections of the phase shifter, it follows that phase shifter 60 shifts the phase of the sinusoidal wave generated by oscillator 10, while phase shifter 62 shifts the phase of the 18th harmonic. The phase shifters are of the resistance-condenser type employing variable condensers which provide a 360 degree phase shift per revolution of the condenser rotors. The gears of gear box 64 have an 18 to 1 ratio, so that the harmonic is shifted 18 cycles, when the fundamental wave is shifted one cycle. Thus, a specific crest of the 18th harmonic is constantly in phase with the specific crest of the fundamental wave. This strict phase relationship between the specific crests of the 18th harmonic and of the fundamental wave is of important functional value not only in providing a greater accuracy in determining the range, but also in providing a sweep expander, a center notch on the screen of the range oscilloscope, and return trace blocking potentials for the range and azimuth oscilloscopes, as it will be subsequently described in the specification. Moreover, the above mentioned phase relationship is also of important functional value in connection with the proper functioning of the automatic ranger which represents the object of this invention.

Figures 2, 4, 5, 6, 7:
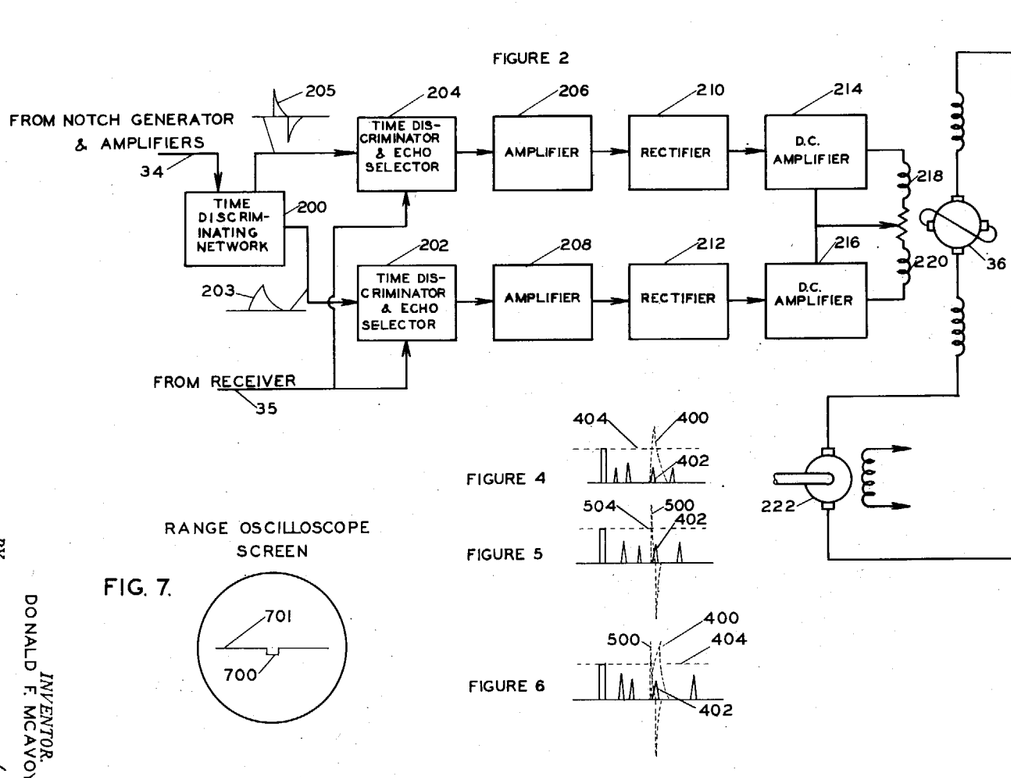
Figure 2 is a block diagram of the automatic ranger.
Figures 4, 5, and 6 are graphical illustrations of certain signals to aid in the understanding of the invention.
Figure 7 illustrates a base line as it normally appears on the screen of a range oscilloscope.

The fundamental frequency generated by oscillator 10, after its transmission through phase shifter 60, is impressed on a dephasing transformer 19, which has a center-tapped secondary, the upper half of which is connected to a pulse generating network 20, while the lower half of which is connected to an identical pulse generating network 21, these networks receiving the fundamental sinusoidal wave 180 degrees out of phase with respect to each other. The networks 20 and 21 comprise two parallel channels composed of over-driven amplifiers, and resistance-condenser differentiating networks where the sinusoidal wave is transformed into a series of narrow rectangular pulses of positive and negative value shown at 66 and 68, the rectangular pulses in one channel being 180 degrees out of phase with the corresponding pulses in the other channel. The 18th harmonic, which appears in the output circuit of phase shifter 62, is impressed on a notch network 18, which represents several stages of zero biased amplifiers. These eliminate the negative half of the 18th harmonic, and transform the positive half into a series of rectangular pulses, the duration of which may be, for example, in the order of ⅙ of the period of the harmonic frequency. The output of the notch generating network 18 is shown at 70; it is impressed on a potentiometer resistance 22 in such a manner that every 9th pulse is superimposed alternately upon the center portion of the rectangular waves generated by the networks 20 and 21. The resultant signals are shown at 72 and 73. The width of the rectangular pulses generated by the networks 20 and 21 are several times the width of the rectangular pulses shown at 70. The widths of the rectangular pulses, 70, 66, and 68 are so adjusted that after notch pulse 70 is superimposed over the center of the rectangular pulse 66 or 68, only one notch pulse will appear on the crest of each rectangular wave. The resultant wave form, shown at 72, is impressed on a critically biased amplifier in the saw-tooth oscillator 23, which suppresses the main rectangular pulse and transmits only the narrow, superimposed notch pulse. This notch pulse, occuring once per each oscillation of synchronizing oscillator 10, and once per each pulse sent by transmitter 13, is used for triggering a saw-tooth oscillator 23, the saw-tooth output of which, after a modification which will be described presently, is impressed on the horizontal plates 74 of range oscilloscope 26. In order to increase the resolving power of the central portion of the screen of the range oscilloscope, the sweep voltage, generated by saw-tooth oscillator 23, is modified by combining it in a sweep amplifier 25 with the voltage generated by a sweep expander 24. Sweep expander 24 consists of a saw-tooth oscillator triggered by a pulse generated by the pulse generating network 21. By giving proper time constants to the components of the saw-tooth generator in sweep expander 24, the saw-tooth voltages generated by saw-tooth oscillator 23 and sweep expander 24 are combined in sweep amplifier 25 so as to give the sweep voltage the wave form illustrated at 75. This wave will expand laterally the signals appearing along the steep portion of the sweep line so that the selected echo signal may be more carefully centered on the screen of the range oscilloscope. A negative portion of the triggering pulse in the saw-tooth oscillator circuit 23 is impressed on the grid of the range oscilloscope 26 for blocking the cathode-ray beam when it performs its return sweep trace.

The combined output of the networks 18 and 21 illustrated at 73 is impressed on a notch generator and amplifier circuit 27. The latter consists of a critically biased amplifier which suppresses all signals except that rectangular pulse 70 generated by network 18 which is superimposed over the positive rectangular pulse generated by network 21. The output of this critically biased amplifier is connected to a second amplifier, which linearly amplifies the rectangular pulse impressed upon it. The output of this amplifier is illustrated at 76. It is impressed on the vertical plate of the range oscilloscope 26 where it produces a center-notch 700, Fig. 7, which is positioned directly in the center of the sweep line 701.

The output of notch generator and amplifier 27 is also connected to an amplifier and inverter circuit 30, which transforms the signal impressed upon it into a signal shown at 77. This strong positive signal is impressed on the grid of the azimuth oscilloscope 29 where it overcomes the biasing potential normally blocking this tube. Therefore, the azimuth oscilloscope 29 is rendered operative only for the duration of the pulse 77. Pulse 77 is in phase with the saw-tooth voltage generated by a sweep generator 28, the latter being connected on its input side to the notch generator and amplifier 27, and on its output side to the horizontal plate of the azimuth oscilloscope 29. The constants in the sweep circuit of generator 28 are such that the discharge period is equal to the width of the rectangular pulse 77, which, in turn, is equal in duration to the rectangular pulse 70. This pulse, as it may be recalled, is generated by the notch network 18, and has its source in the 18th harmonic. This short period of discharge is used as a means of producing a sweep voltage for the azimuth oscilloscope 29, and, from the relationship of the triggering pulses, it follows that a single horizontal sweep on the screen of the azimuth oscilloscope will take place during that period when the range oscilloscope beam travels across notch 700, Fig. 7. The effect is an expanded view of the notch portion of the range oscilloscope baseline, and of the signals superimposed thereon, the duration of the unblocking pulse 77 being synchronous and in phase with notch 700.

The connection between sweep generator 28 and antenna lobe switcher 14 provides a square wave voltage synchronized with the antenna lobe switching. It is utilized in the sweep generator 28 for producing two laterally displaced lines on the screen of the azimuth oscilloscope 29, so that the echo signals received on one antenna lobe appear laterally displaced on the oscilloscope screen with respect to the echo signals received on the other lobe.

The transmitted signal as well as the echo signals are impressed on receiver 31 where they are amplified and detected. The output of receiver 31 is impressed on the vertical deflection plates of the range oscilloscope 26 over conductor 54, and on the vertical deflection plates of the azimuth oscilloscope 29 over conductor 52, and on a meter tracker 32 over conductor 56.

Meter tracker circuit 32 functions as an additional azimuth indicator, the visual indications being provided by a zero-center scale meter which indicates the direction of deviation of the antenna from its on-object position. The rectangular pulses from notch generator and amplifier 27 are utilized in meter tracker 32 for selecting the desired echo signal, and a synchronous mechanical switch connected to antenna lobe switcher 14 is used for separating the channel components of the selected echo signal, whereupon they are compared in the above mentioned zero-center scale meter.

The operation of the radio object locator is briefly as follows: The range oscilloscope operator selects the desired echo signal on the range oscilloscope, and measures the range distance to the selected echo-producing object by operating manually a phase shifter 17 so as to put the selected echo signal in the center of notch 700, Fig. 7. The degree of phase shift imparted to the fundamental wave and its 18th harmonic is used as a means for measuring the range distance to the selected object. When the operator of the range oscilloscope selects the desired echo by placing it in the notch he also automatically selects this echo signal on the screen of the azimuth oscilloscope, since, as it may be recalled, only the signal appearing in the notch of the range oscilloscope can ever appear on the screen of the azimuth oscilloscope. Therefore, the operator of the azimuth oscilloscope sees only the echo placed in the notch by the range operator. It may be recalled, that because of the effect produced by the rectangular wave 80 on the sweep voltage, the lobe components of the selected echo signal appear laterally displaced with respect to each other on the screen of the azimuth oscilloscope. The amount of this latter displacement may be adjusted by adjusting the amplitude of wave 80. The azimuth operator is thus provided with two signal patterns which appear side by side on the screen of the azimuth oscilloscope, the amplitude of each pattern being proportional to the amplitude of the components of the echo signal received over the corresponding lobe. If the amplitudes are equal, the antenna points directly at the object. If they are unequal, they indicate by their inequality the direction in which the antenna must be revolved to make the two signals of equal amplitude. The equalization of the amplitudes at once determines the azimuth of the echo producing object. In this manner the range as well as the azimuth of the selected object may be determined by means of this system.

Referring now to the description of my invention which comprises an automatic ranging unit shown at 78 in Fig. 1, conductor 35 connects the automatic ranger circuit 33 to the output of the receiver, while conductor 34 connects it to a notch generator and amplifier 27. Automatic ranger circuit 33 is connected to a torque amplifier 36, which is mechanically connected to phase shifter 17 by a shaft 38.

Referring now to the block diagram of the automatic ranger shown in Fig. 2, conductors 34 and 35 connecting the automatic ranger to the radio object-locating system shown in Fig. 1 appear at the left extreme portion of Fig. 2, conductor 34 being connected to a time-discriminating network 200, while conductor 35 is connected in parallel to time-discriminators and echo selectors 202 and 204. The notch signal impressed on the time-discriminating network 200 is transformed here into two signals illustrated at 205 and 203, Fig. 2 which are also shown at 500 in Fig. 5, and at 400 in Fig. 4. The phase relationship of the time-discriminating signals and the selected echo pulse is also illustrated in these figures, the echo pulse being illustrated at 402 in both figures. The relative phase relationship of the signals illustrated in Figs. 4 and 5, is illustrated in Fig. 6. Examination of Figs. 4, 5 and 6 reveals that the selected echo pulse is so positioned with respect to signals 500 and 400, that the peak of the former leads the echo signal, and the peak of the latter lags the echo signal. The combination of signals illustrated in Fig. 5 is impressed on the time-discriminator and echo selector 204, while the combination of signals of Fig. 4 is impressed on time-discriminator and echo selector 202. The remaining echo signals and the transmitted signal are illustrated in these figures as being on either side of the time-discriminating pulses. The control voltages on the thermionic elements representing time-discriminators and echo selectors 202 and 204 are so adjusted that all echo signals, the amplitude of which is below the dotted lines 404, Figs. 4 and 6, and the line 504, Fig. 5, produce no signals in the output circuits of the selectors. However, since the selected echo signal 402 partially coincides in time with the portions of the time-discriminating signals, the latter varying the transconductance of the selectors, the upper peak of this signal will project itself above the dotted line 404, Fig. 6 with the resultant output signal in the selectors 202 and 204. This output signal will consist of that portion of the selected echo signal which exceeds the blocking potential of the selector and coincides with its high transconductance, all other echo signals as well as the transmitted signal being suppressed by the selector stage control potentials. The time-discriminating pulses 400 and 500 do not appear in the output circuits of the ranger as it will be explained hereinafter.

The current produced in the output of the circuits 204 and 202 is amplified in amplifiers 206 and 208, rectified in rectifiers 210 and 212, and amplified once more in direct current amplifiers 214 and 216. The output of the latter is connected to differential field windings 218 and 220 of a torque amplifier 36, which is connected to a direct current motor 222, shaft 38 of which connects this motor to phase shifter 62 in range unit 17, Fig. 1. Since the echo signals at this stage render the two channels equally conductive, the two currents cancel each other in the windings 218—220 of torque amplifier 36.

When the selected echo signal shifts to the left, which is caused by the selected object approaching the radio locator, it projects itself more and more above line 404 in Fig. 5, since it then coincides with the higher portion of the time-discriminating pulse 500. At the very same time this very same pulse, by moving to the left in Fig. 4 will coincide with the lower portion of curve 400. This increases the output signal from discriminator and selector 204, and decreases the output signal from discriminator and selector 202, which results in a large current in coil 218, and a smaller current in coil 220. If the selected object is receding from the radio locator, the discriminator and selector stages become unbalanced in the reverse manner, so that there is a reversal in polarity of the resultant field produced by coils 218—220. Therefore, when the selected object moves toward or away from the locator, a field current either of one polarity or of the opposite polarity is impressed on torque amplifier 36. Direct current motor 222 will follow these changes and adjust the phase shifters 62 and 60 in range unit 17 so as to automatically reestablish the proper phase relationship between the selected echo signal and the time-discriminating pulses shown in Fig. 6, and restore the proper phase relationship between the selected echo signal and the rectangular pulse on the screen of the range oscilloscope. As this condition is maintained automatically, the range is constantly indicated on the scale of range unit 17.

Figure 3:
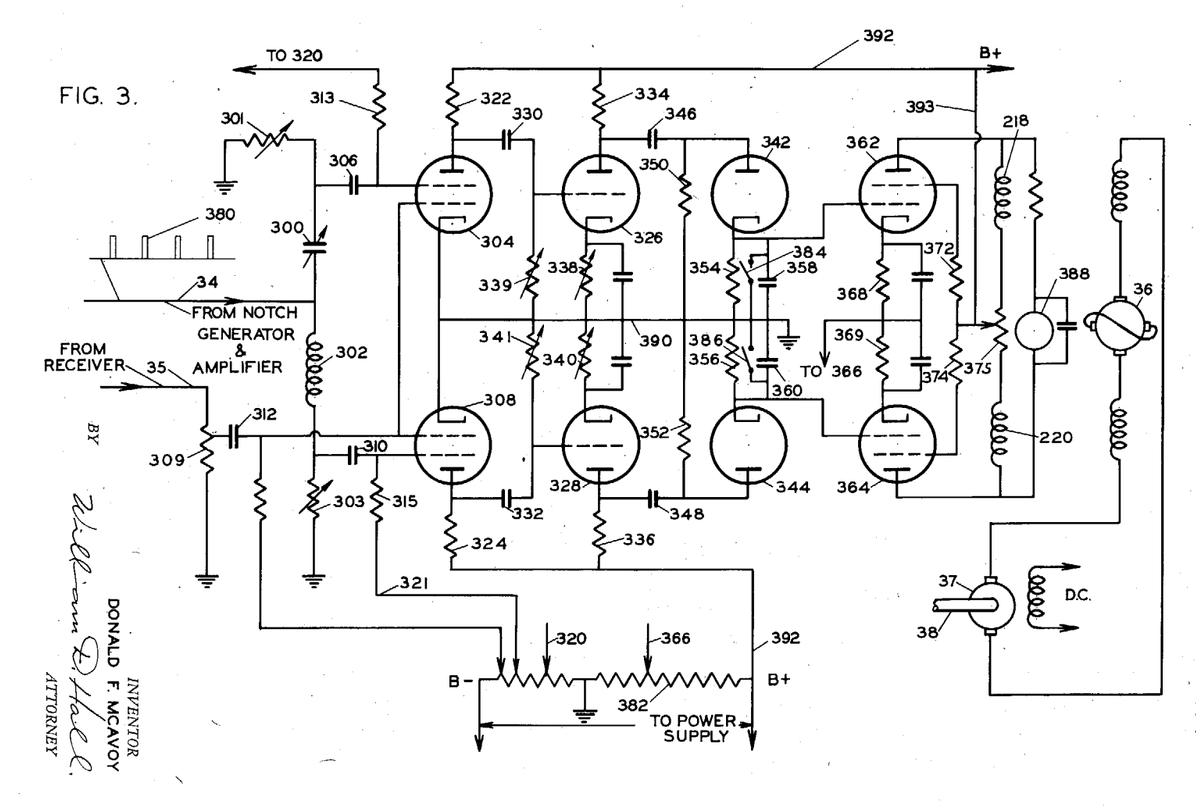
Figure 3 is a schematic diagram of the automatic ranger.

Referring now to Fig. 3, which is a schematic diagram of the automatic ranger, the positive rectangular pulse 380 from notch generator and amplifier 27 is impressed over conductor 34 on time-discriminating network composed of two parallel branches, a capacitive branch composed of an adjustable resistor-condenser combination 301—300, and an inductive branch composed of an adjustable resistance inductance combination 303—302. The additional notch amplifiers which are interposed between time-discriminating networks and notch generator and amplifier 27 are not shown in the drawing. The signal produced by the resistance-condenser network is the distorted pulse 500 shown in Fig. 5. It is impressed on the screen grid of a tetrode 304 through a coupling condenser 306. The output of the inductive branch consists of a distorted pulse 400 shown in Fig. 4. It is impressed on the screen grid of a tetrode 308 through a coupling condenser 310. The screen grids of tetrodes 304 and 308 are connected over resistors 313 and 315, and conductors 320 and 321, to a source of potential illustrated as a bleeder resistor 382 at the bottom of the schematic diagram. A higher negative potential may be impressed on the screen grid of one tetrode than on the screen grid of the other tetrode. This is the case when the time-discriminating networks are so adjusted that the signal produced by one branch has a somewhat higher amplitude than the signal produced by the other branch. Since signals 400, Fig. 4 and 500, Fig. 5 are inherently asymmetric, the adjustment of the time-discriminating networks and of the potentials impressed on the screen grids 304, 308 must be such as to render the response of tetrodes 304, 308 as equal as it is practicably obtainable by adjusting the time-discriminating networks and the screen grid voltages. Moreover, potentials impressed on the screen grids and the control grids of the tetrodes are so adjusted that no signals impressed on the control grids of tetrodes 304 and 308, which are connected to the output of the receiver over conductor 35, a potentiometer resistance 309, and a coupling condenser 312, appear in the output circuits of these tetrodes, except a portion of the selected echo signal, and a portion of the time-discriminating signal which renders tetrodes 304 and 308 partially conductive. These are impressed on the control grids of triodes 326 and 328, through coupling condensers 330 and 332, the triodes being biased through adjustable resistors 338 and 340. Any inequality in the output of the selector tubes 304, 308 which is due to the asymmetry of the time-discriminating pulses is nullified by adjusting resistors 338, 339, 340 and 341. This adjustment may be checked by first closing switch 384 and observing the reading on a meter 388, and then by opening switch 384, and closing switch 386, and observing the reading on meter 388. In both cases, the meter reading should be of equal magnitude but of reverse polarity.

In order to check whether the two parallel channels have equal sensitivity when the selected echo signal changes its phase relationship with respect to the time-discriminating signals, a transmitted pulse may be selected on the screen of the range oscilloscope and with the receiver's gain turned down, its position on the screen of the range oscilloscope is varied by turning the phase shifter 62 equal angles, first to the left and then to the right from its normal zero position. With the channels properly balanced, an equal response should be indicated on meter 388. The positive voltage pulses appearing across plate resistors 334 and 336 are impressed on the plates of diode rectifiers 342 and 344 over coupling condensers 346 and 348, and resistors 350 and 352 respectively, these resistances being connected to a grounded conductor 390 which completes the circuit between the ground connected to bleeder resistor 382 and conductor 392 connecting the anodes of the tubes to the positive side of bleeder resistor 382. The control grids of tetrodes 362 and 364 are connected to the output circuits of the diode rectifiers comprising resistance-condenser combinations 354—358 and 356—360, these resistance-condenser combinations acting as integrating circuits for the outputs of the diodes. Condensers 358 and 360 are shunted by switches 384 and 386 which are used for disconnecting one channel from meter 388 in the process of balancing the automatic ranger. The resistance-condenser combinations 354—358 and 356—360 are so adjusted that the voltages impressed on the control grids of tetrodes 362 and 364 respectively by these combinations are substantially proportional to the peak voltages impressed on rectifiers 342 and 344. Direct current amplifiers 362 and 364 are so biased as to give a linear amplification of the signals impressed on the control grids, this biasing being obtained by grounding the control grids and by connecting the cathodes of tetrodes 362 and 364 over a conductor 366 and resistors 368 and 369 to a point on bleeder resistance 382 which is above the ground potential. The screen grids of tetrodes 362—364 are connected in a conventional manner to the positive side of bleeder resistor 382 through resistors 372 and 374, while the anodes are connected to the same source through differential field windings 218 and 220 of torque amplifier 36, a balancing resistor 375, and conductors 392 and 393. Resistor 375 is of a potentiometer type as shown, and enables one to balance the output of direct current amplifiers when the phase relationship shown in Fig. 6 is maintained. With resistance 375 properly adjusted, the currents normally carried by the differential windings 218—220 are equal, and produce two opposite fields which cancel each other in torque amplifier 36. The torque amplifier is illustrated as the "Amplidyne" generator 36 driven by a motor not shown, the former having two differential field windings 218 and 220. The output of the "Amplidyne" set is impressed on a reversible-direct current motor 37, shaft 38 of which is connected to range unit 17 illustrated in Fig. 1.

The operation of the automatic ranger is as follows: When the range operator is in the process of selecting the desired echo pulse on the screen of the range oscilloscope, he must resort to a manual operation of the phase shifters in the range unit, and the automatic ranger should remain disconnected at this time. Once the desired echo signal has been selected, the control of phase shifter 17 and the automatic ranging of the moving object may be transferred to the automatic ranger which will automatically follow from then on any movement of the echo-producing object by adjusting the phase shifter 17 by means of the reversible-direct current motor 37 so as to keep the selected echo signal in the center of notch 700 on the screen of the range oscilloscope. This result is accomplished by impressing the amplified output of notch generator and amplifier 27, Fig. 1, on two time-discriminating networks which transform this notch into two signals illustrated at 400 and 500 in Figs. 4 and 5, the peak of the former lagging the echo signal 402 selected by the range operator, and the peak of the latter leading the same signal. Signal 400 is impressed on the screen grid of tetrode 308 and signal 500 is impressed on the screen grid of tetrode 304. The normal transconductance of these tetrodes is so adjusted by means of the potentials impressed on the screen grids and the control grids of these tetrodes that all signals impressed on the control grids of these tetrodes by the receiver, except the echo signal selected by the range operator are blocked, and do not appear in the output circuits of these tetrodes. Since the echo signal selected by the range operator has a phase relationship with respect to the time-discriminating signals as illustrated in Figs. 4 to 6, the transconductance of tetrodes 304 and 308 is increased by the time-discriminating signals impressed on the screen grids to such an extent that the upper part of the echo signal renders them partially conductive. The output of each tetrode is amplified, rectified, and the rectified signal is impressed on the resistance-condenser combination, the latter being charged to a voltage proportional to the peak voltage produced in the aforementioned tetrodes by the selected echo signal. This condenser voltage is used to control the conductivity of direct current amplifier 362 in one channel, and direct current amplifier 364 in the other channel, the latter being connected to an identical resistance-condenser combination of the rectifier in the second channel. The outputs of the direct current amplifiers 362, 364 are connected to the differential field windings 218, 220 of the torque amplifier, the latter in turn controlling the reversible-direct current motor mechanically coupled to phase shifter 17, Fig. 1. When the echo signal selected by the range operator is centrally located on the screen of the range oscilloscope, the conductivities of the two parallel channels in the automatic ranger are equal, and, as a result, no voltage is generated by the torque amplifier. Consequently, the reversible-direct current motor remains stationary. When there is a change in time relationship between the time discriminating pulses and the selected echo signal, one channel of the automatic ranger is rendered more conductive, while the other channel is rendered less conductive, depending upon the phase relationship between the echo signal and the time-discriminating signals. When the echo signal shifts to the left in Figs. 4 and 5, tetrode 304 is rendered more conductive, because the echo signal is now impressed on the control grid of tetrode 304 at that instant when its transconductance is higher than before. Conversely, tetrode 308 will be rendered less conductive because of different time relationship between the time-discriminating pulse 400, Fig. 4, and the echo signal 402. As the above time shift progresses, tetrode 304 will be rendered progressively more conductive, and tetrode 308 less conductive, and this difference in the conductivities of the two tetrodes will be transmitted to the differential field windings of the torque amplifier resulting in the rotation of the direct current motor 37 which will transmit its rotation to the phase shifter 17, the latter restoring the normal phase relationship between the selected echo signal and the time-discriminating pulses. The above process is reversed when the selected echo signal changes its time relationship with respect to the time discriminating pulses in the opposite direction.

The advantages of the automatic ranger described in this specification may be summarized as follows: It enables one to operate the radio object-locating system with a greater degree of precision than the precision obtainable when the system is operated manually. The ranger may be very readily connected and disconnected from the radio object-locating system without disrupting its normal functioning cycle either before or after the disconnection of the automatic ranger. All circuits are of entirely electronic nature which use vacuum tubes and the only mechanical element that is used by the system relates to the driving equipment. Therefore, the circuits may be adjusted to a high degree of precision which will be maintained throughout the normal functioning cycle and life of the equipment.

It should be understood that while I have shown simple triodes in some parts of the schematic diagram, in actual practice the tubes may have a larger number of elements, and may be replaced with pentodes or other multiple tubes having greater efficiency when used with the video signals here contemplated. Moreover, while I have shown the torque amplifying means as comprising an "Amplidyne" set, any other torque amplifying means may be used for accomplishing the contemplated results. It is believed that the construction and operation of my automatic system as well as the many advantages thereof, will be apparent from the foregoing description. It will, therefore, be apparent that while I have shown and described my invention in a preferred form, many changes and modifications may be made without departing from the spirit of the invention as sought to be defined in the following claims.

I claim:

1. A radio object locating system comprising an oscillator, a harmonic generator connected to and excited by said oscillator, first and second mechanically interconnected phase shifters for determining the range of a moving object producing an echo, said first phase shifter being connected to said oscillator and said second phase shifter being connected to said harmonic generator, a receiver, first and second parallel channels connected to said receiver, a circuit connected between said second phase shifter and said two parallel channels, said circuit generating first and second time discriminating pulses and impressing said first pulse on said first channel and said second pulse on said second channel in time relationship making said first pulse leading and said second pulse lagging said echo when the settings of said phase shifters correspond to the range of said object whereby any shift in phase of said echo with respect to said first and second pulses increases the conductivity of one channel and decreases the conductivity of the other channel.

2. A radio object locating system as defined in claim 1 in which the input circuits of said first and second channels include first and second tetrodes respectively, each having a control grid and a screen grid, the control grids of said tetrode being connected to said receiver, and the screen grids of said tetrodes being connected to said circuit, whereby said circuit impresses said first time discrimination pulse on the screen grid of said first tetrode, and said second time-discriminating pulse on the screen grid of said second tetrode, the normal potentials on said control and screen grids being adjusted to keep said tetrodes normally non-conductive, whereby said tetrodes respond to said echo only when said echo and the discriminating pulses are impressed at least in part simultaneously on the control and the screen grids respectively of one of said tetrodes.

3. In a radio object-locating system, a circuit for determining the distance to a given one of a plurality of reflecting objects, comprising a transmitter of a series of exploratory pulses to said plurality of reflecting objects; a receiver for a plurality of a series of pulses reflected from said objects; a control pulse generator coupled to said transmitter for generating a control square-wave voltage pulse in synchronism with each of said exploratory pulses, said control pulses having a duration not more than one-fiftieth of the interval between successive exploratory pulses and having substantially the same periodicity as said exploratory pulses; means coupled to said transmitter, to said control pulse generator, and to said receiver for adjusting the time relationship between each of said exploratory pulses and its corresponding control pulse so that there is an approximate time coincidence between each of said control pulses and its corresponding reflected pulse from said given one of said reflecting objects; means coupled to said receiver and to said control generator, said last-named means including means for differentiating said control pulses, means for integrating said control pulses, and means responsive to the ratio of the difference between the time of occurrences of each of said differentiated control pulses and its corresponding reflected pulse and the difference between the time of occurrences of each of said corresponding reflected pulses and integrated control pulses for further adjusting said time relationship to bring and maintain said control pulses and reflected pulses in exact time coincidence; and means responsive to said means for adjusting the time relationship for indicating the magnitude of said adjustment to provide a continuous indication of the distance.

4. A circuit according to claim 3 wherein said means for maintaining said control pulses and reflected pulses in exact time coincidence comprises a first mixer connected to said receiver and to said control pulse generator to be supplied with the differentiated output of said control pulse generator for mixing said reflected pulses from said given one of said reflecting objects with said differentiated control pulses, a second mixer connected to said receiver and to said control pulse generator to be supplied with the integrated output of said control pulse generator for mixing said reflected pulses from said given one of said reflecting objects with said integrated control signals, first and second means for rectifying and amplifying respectively the outputs of said first and second mixers to provide a respective first and second direct current output, phase shift means coupled to the output of said control pulse generator, means connected to said phase shift means and responsive to the current difference between said first and second direct currents for actuation of said phase shift means for effecting a continuous control of the phase of each of said square wave pulses with respect to its corresponding exploratory pulse to maintain said current difference at a predetermined value.

5. A radio-object detecting system, comprising a transmitter for transmitting pulses of high frequency energy toward a reflecting object; means connected to said transmitter for controlling the transmitter pulse repetition frequency; a receiver for echo signals reflected from said object; phase shift means coupled to said controlling means; means coupled to said phase shift means for generating a pair of control pulses in synchronism with each of said transmitted pulses, said pair of control pulses having a fixed phase difference therebetween; first mixer means coupled to said control pulse generating means and to said receiver for combining each of the first pulses of said pairs of control pulses with its corresponding received echo signal; second mixer means coupled to said control pulse generating means and to said receiver for combining each of the second pulses of said pairs of control pulses with its corresponding received echo signal; means coupled to said phase shift means and to said pulse generating means for adjusting to a predetermined value the phase relationship between each pair of control pulses and its corresponding echo signal so that each of said first control pulses leads its corresponding echo signal and each of said second control pulses lags its corresponding echo signal; means coupling said second and said first mixer means to said phase shift means and connected to be responsive to the outputs of said first and said second mixer means, for actuation of said phase shift means to maintain constant said predetermined value of the phase relationship between each pair of control pulses and its corresponding echo signal; and means connected to said controlling means and to said phase shift means for translating the phase difference between each of said transmitted pulses and each of said corresponding pairs of control pulses into an indication of distance, said last-named phase difference being a function of said maintained predetermined value of the phase relationship between each pair of control pulses and its corresponding echo signal.

DONALD F. McAVOY.

References Cited in the file of this patent

UNITED STATES PATENTS

| Number | Name | Date |
|---|---|---|
| 2,063,534 | Wallace | Dec. 8, 1936 |
| 2,312,203 | Wallace | Feb. 23, 1943 |
| 2,422,074 | Bond | June 10, 1947 |
| 2,534,862 | Fox | Dec. 19, 1950 |

FOREIGN PATENTS

| Number | Country | Date |
|---|---|---|
| 455,765 | Great Britain | Oct. 27, 1936 |